United States Patent Office 3,741,924
Patented June 26, 1973

3,741,924
RUBBER COMPOSITION
Taisuke Okita, Toyonaka, and Nobuyuki Yoshida, Takatsuki, Japan, assignors to Taoka Dyestuffs Manufacturing Co. Ltd., Osaka, Japan
No Drawing. Filed Feb. 13, 1970, Ser. No. 11,314
Claims priority, application Japan, Mar. 8, 1969, 44/17,827
Int. Cl. C09j 3/26
U.S. Cl. 260—27 R
7 Claims

ABSTRACT OF THE DISCLOSURE

There is obtained an ethylene-propylene-non-conjugated diene terpolymer rubber composition with improved tackiness and processability in the unvulcanized state, but nevertheless, with substantially the same physical properties in the vulcanized state as that of a conventional composition of said terpolymer rubber, by incorporating into 100 parts by weight of said terpolymer 1–40, preferably 2–30, parts by weight of an ethylene-α-olefin copolymer and 0.5–30, preferably 1–20, parts by weight of an alkylphenol-formaldehyde resin, a modified alkylphenol-formaldehyde resin, rosin, rosin ester, or a mixture of these resins.

---

This invention relates to a rubber composition with improved tackiness and processability in the unvulcanized state, but nevertheless, without accompanying the deterioration of physical properties in the vulcanized state, which comprises an ethylene-propylene-nonconjugated diene terpolymer (hereinafter referred to as EPT), an ethylene-α-olefin copolymer, and a special tackifier.

Whereas the vulcanizate of EPT has far superior resistance to ozone, weathering, and heat, over other rubbers, the unvulcanized EPT has a poor tackiness and an insufficient processability, which have caused major inconveniences in the fabrication of rubber goods.

To overcome the above-mentioned disadvantages of EPT, various tackifiers and processing aids had hitherto been proposed, but so far none of them have gained complete success.

In an exhaustive search for some means to improve said shortcomings of EPT, the present inventors had tested a variety of tackifiers available so far on market with respect to their improving effect on tackiness and processability of EPT and confirmed their effectiveness to a certain degree, but failed to obtain satisfactory results. On the other hand, the present inventors had tested, also, the improving effect of various polymers of lower molecular weight and found that though these low polymers were fairly effective with respect to the improvement of tackiness and processability of EPT, they were not preferable because of their deteriorating effect on physical properties of the vulcanizate. Then, the present inventors came upon an idea of using a tackifier and a low polymer in combination, and have now succeeded in remarkably improving the tackiness and processability of EPT at no sacrifice in physical properties of the vulcanizate, by using as the tackifier an alkylphenol-formaldehyde resin, a modified alkylphenol-formaldehyde resin, rosin, or a rosin ester, along with an ethylene-α-olefin copolymer as the low polymer.

An object of the invention is to provide an EPT rubber composition with improved tackiness and processability.

Another object of the invention is to provide an EPT rubber composition with a remarkably increased tackiness and processability in the unvulcanized state, but nevertheless with satisfactory physical properties in the vulcanized state.

Other objects and advantages of the invention will become apparent from the following description.

According to the present invention there is provided an EPT rubber composition which comprises 100 parts by weight of an EPT, 1 to 40 parts by weight of an ethylene-α-olefin copolymer, and 0.5 to 30 parts by weight of an alkylphenol-formaldehyde resin, a modified alkylphenol-formaldehyde resin, rosin, or a rosin ester.

The EPT used in the invention is produced by polymerizing a ternary mixture consisting of ethylene, propylene, and a nonconjugated diene by use of a catalyst well known to the art, particularly a catalyst of the Ziegler-Natta type.

Said terpolymer consists of 48 to 80% (mole) of ethylene, 20 to 50% (mole) of propylene, and 0.5 to 10% (mole) of a nonconjugated diene. Typical non-conjugated dienes, used as the third monomer in said terpolymer, include 1,4-hexadiene, dicyclopentadiene, 5-methylene-2-norbornene, 5-ethylidene-2-norbornene, 4,7,8,9-tetrahydroindene, etc.

The ethylene-α-olefin copolymer used in the present invention is produced by polymerizing ethylene together with α-olefin in the presence of a catalyst of the Ziegler-Natta type, and has an intrinsic viscosity ($\eta$) of 0.05 to 3.0 dl./g. as measured in a Tetralin solution at 135° C. (the same condition of measurement shall apply to all intrinsic viscosities as hereinafter referred to).

An example of the copolymer which can be used is the ethylene-propylene copolymer produced as the soluble fraction in a polymerization medium used in the process for manufacturing a crystalline ethylenepropylene copolymer by use of a catalyst of the Ziegler-Natta type, said soluble copolymer containing 2 to 20% by weight of ethylene and having an intrinsic viscosity of 0.05 to 3.0 dl./g.

An amorphous ethylene-propylene copolymer produced by polymerizing ethylene and propylene in the presence of a coordinated catalyst of the Ziegler-Natta type, containing 50 to 90 percent by weight of ethylene, and having an intrinsic viscosity of 0.05 to 3.0 dl./g., can also be used.

The alkylphenol-formaldehyde resin used in the present invention is a substance obtained in a usual known way by the polycondensation of alkylphenol and formaldehyde.

The modified alkylphenol-formaldehyde resin used in the present invention is produced by modifying the abovesaid alkylphenol-formaldehyde resin with, for example, a terpene or glycerin.

The rosin and rosin ester used in the present invention are a natural rosin, a hydrogenated natural rosin, and esters of these rosins with glycerin, triethylene glycol, pentaerythritol, etc.

The rubber composition of the invention is produced by mechanically mixing by means of a mixing mill or a Banbury mixer, 100 parts by weight of an EPT together with a mixture comprising 1 to 40, preferably 2 to 30, parts by weight of an ethylene-α-olefin copolymer and 0.5 to 30, preferably 1 to 20, parts by weight of an unmodified or modified alkylphenol-formaldehyde resin, rosin, rosin ester, or a mixture of these resins.

When the amounts of the two components other than the EPT are smaller than the lower limits defined above, the tackiness and processability cannot be enhanced, and when they are larger than the upper limits defined above, the physical properties of the vulcanized rubber, particularly resilience, compression set and modulus, are deteriorated so that the composition cannot practically be used.

The present composition may further contain xylene-formaldehyde resins, alkylphenol-acetylene resins and/or polybutene according to purposes.

The rubber compositions of the invention are suitable for those uses of EPT where there are required an improved tackiness and processability of the unvulcanized stock as well as physical properties of the vulcanizate equivalent to those of other conventional EPT compositions, such as linings, roofing sheets, belts, rolls, white side wall, black side wall and cover strips.

The invention will be further illustrated in detail with reference to the following examples, which are, needless to say, not intended to limit the invention.

above-mentioned rubber compounds by press vulcanization at 150° C. for 10 minutes.

The tensile stress at 200% elongation, tensile strength, elongation, and hardness were measured with a tensile tester (made by Shimazu Seisaku-Sho) at a tensile rate of 500 mm./min. and at 20° C. according to JIS K–6301. The heat resistance was expressed as a ratio (in percent) of the residual tensile strength after ageing in a test tube heating ageing tester according to JIS K–6301, to the initial tensile strength before ageing.

TABLE 1

|  | Reference Example No. |  |  |  |  | Example No. |  |  |
|---|---|---|---|---|---|---|---|---|
|  | 1 | 2 | 3 | 4 | 5 | 1 | 2 | 3 |
| EPT (parts by wt.) | 100 | 100 | 100 | 100 | 100 | 100 | 100 | 100 |
| Ethylene-propylene copolymer (parts by wt.) |  | 15 |  |  |  | 10 | 10 | 10 |
| Hydrogenated rosin, (parts by wt.) |  |  | 15 |  |  | 5 |  |  |
| Terpene-modified alkylphenolformaldehyde resin (parts by wt.) |  |  |  | 15 |  |  | 5 |  |
| Glycerin ester of rosin (parts by wt.) |  |  |  |  | 15 |  |  | 5 |
| Tackiness (g./mm.) | 24.5 | 42.9 | 32.5 | 35.0 | 37.0 | 65.5 | 60.8 | 60.0 |
| Physical property of vulcanizate: |  |  |  |  |  |  |  |  |
| Tensile stress at 200% (kg./cm.²) | 90 | 74 | 85 | 86 | 84 | 63 | 61 | 70 |
| Tensile strength (kg./cm.²) | 203 | 188 | 200 | 196 | 198 | 190 | 200 | 213 |
| Elongation (percent) | 425 | 445 | 450 | 460 | 480 | 495 | 505 | 500 |
| Heat resistance; retention of tensile strength (percent) | 91 | 82 | 85 | 89 | 87 | 90 | 93 | 92 |

EXAMPLES 1–3

100 parts by weight of the ethylene-propylene-ethylidene norbornene terpolymer ("Royalene 501," trade name), 10 parts by weight of the ethylene-propylene copolymer containing 10% by weight of ethylene and having an intrinsic viscosity of 0.5 dl./g., which had been obtained as a soluble fraction in the polymerization medium used in the manufacture of a crystalline ethylene-propylene copolymer, and 5 parts of a hydrogenated rosin (softening point, 70° C.; acid value, 162), terpene-modified alkylphenol-formaldehyde resin (softening point, 133° C.; acid value, 65), or glycerin ester of rosin (softening point, 91° C.; acid value, 7) were mixed at 40° to 50° C. by means of a roll mill. Each of the rubber compositions thus obtained were further milled thoroughly by means of a roll mill with the addition of 50 parts by weight of HAF black, 5 parts by weight of zinc oxide, and 1 part by weight of stearic acid, and, in addition as the vulcanizing agents, 1.5 parts by weight of tetramethylthiuram monosulfide, 0.5 part by weight of mercaptobenzothiazole, and 1.5 parts by weight of sulfur.

Each of the rubber compounds thus obtained was made into a sheet, 1 mm. in thickness, by means of a roll mill with regulated nip, said sheet being used as the test piece for the measurement of tackiness.

The tackiness was measured wtih a tackmeter of the pick-up type (made by Toyo Seiki) under the following conditions: temperature, 25° C.; pressing load, 500 g.; press period, 10 seconds; peeling rate, 10 cm./min.

The measurement of physical properties of the vulcanizate was made on the test pieces prepared from the

EXAMPLES 4–6

100 parts by weight of the ethylene-propylene-dicyclopentadiene terpolymer ("Royalene 301," trade name), 10 parts by weight of an amorphous ethylene-propylene copolymer containing 50 percent by weight of ethylene and having an intrinsic viscosity of 0.4 dl./g. which had been obtained by use of a coordinated catalyst of the Ziegler-Natta type, and parts of an octylphenol-formaldehyde resin (softening point, 68° C.; acid value, 15), a terpene-modified alkylphenol-formaldehyde resin (softening point, 133° C.; acid value, 65), or a glycerin ester of rosin (softening point, 91° C.; acid value, 7) were mixed at 40°–50° C. by means of a roll mill.

Subsequent treatment was conducted in a way similar to that described in Example 1, to obtain the results as shown in Table 2. Vulcanization was carried out at 160° C. for 20 minutes.

TABLE 2

|  | Reference example No. |  |  |  |  | Example No. |  |  |
|---|---|---|---|---|---|---|---|---|
|  | 6 | 7 | 8 | 9 | 10 | 4 | 5 | 6 |
| EPT (parts by wt.) | 100 | 100 | 100 | 100 | 100 | 100 | 100 | 100 |
| Ethylene-propylene copolymer (parts by wt.) |  | 15 |  |  |  | 10 | 10 | 10 |
| Octylphenolformaldehyde resin (parts by wt.) |  |  | 15 |  |  | 5 |  |  |
| Terpene-modified alkylphenolformaldehyde resin (parts by wt.) |  |  |  | 15 |  |  | 5 |  |
| Glycerin ester of rosin (parts by wt.) |  |  |  |  | 15 |  |  | 5 |
| Tackiness (g./mm.) | 20.5 | 36.0 | 29.5 | 31.0 | 31.5 | 48.0 | 51.0 | 50.0 |
| Physical property of vulcanizate: |  |  |  |  |  |  |  |  |
| Tensile stress at 200% (kg./cm.²) | 95 | 80 | 91 | 93 | 90 | 81 | 78 | 83 |
| Tensile strength (kg./cm.²) | 255 | 235 | 245 | 243 | 249 | 243 | 247 | 250 |
| Elongation (percent) | 400 | 410 | 450 | 470 | 475 | 430 | 445 | 450 |
| Heat resistance; Retention of tensile strength (percent) | 94 | 87 | 91 | 92 | 94 | 92 | 93 | 94 |

EXAMPLE 7

100 parts by weight of the ethylene-propylene-ehylidene norbornene terpolymer ("Royalene 501," trade name), 10 parts by weight of an ethylene-propylene copolymer containing 10 percent by weight of ethylene and having an intrinsic viscosity of 0.5 dl./g., which had been obtained as a soluble fraction in the polymerization medium used in the manufacture of a crystalline ethylene-propylene copolymer, 3 parts by weight of a hydrogenated rosin (softening point, 70° C.; acid value, 162), and 2 parts by weight of a terpene-modified alkylphenol-formaldehyde resin (softening point 133° C.; acid value, 65) were mixed at 40–50° C. by means of a roll mill.

Subsequent procedure was similar to that described in Example 1, to obtain the results as shown in Table 3.

TABLE 3

| No. | Reference Example No. 11 | Reference Example No. 12 | Example No. 7 |
|---|---|---|---|
| EPT (parts by wt.) | 100 | 100 | 100 |
| Ethylene-propylene copolymer (parts by wt.) | -- | 15 | 10 |
| Hydrogenated rosin (parts by wt.) | -- | -- | 3 |
| Terpene-modified alkylphenolformaldehyde resin (parts by wt.) | -- | -- | 2 |
| Tackiness (g./mm.) | 24.5 | 42.9 | 62.0 |
| Physical property of vulcanizate: | | | |
| Tensile stress at 200% (kg./cm.²) | 90 | 74 | 65 |
| Tensile strength (kg./cm.²) | 203 | 188 | 195 |
| Elongation (percent) | 425 | 445 | 500 |
| Heat resistance, retention of tensile strenght (percent) | 91 | 82 | 90 |

What is claimed is:

1. An unvulcanized rubber composition which comprises 100 parts by weight of an ethylene-propylene-nonconjugated diene terpolymer, 1 to 40 parts by weight of an ethylene-propylene copolymer produced by the polymerization of ethylene with propylene by the use of a catalyst of the Ziegler-Natta type, and having an intrinsic viscosity of 0.05 to 3.0 dl./g. as measured in Tetralin solution at 135° C., and 0.5 to 30 parts by weight of at least one member selected from the group consisting of an alkylphenol-formaldehyde resin, a rosin and a rosin ester.

2. A rubber composition according to claim 1, wherein the amount of the ethylene-propylene copolymer is 2 to 30 parts by weight.

3. A rubber composition according to claim 1, wherein the amount of at least one member selected from the group consisting of an alkylphenol-formaldehyde resin, a rosin, and a rosin ester, is 1 to 20 parts by weight.

4. A rubber composition according to claim 1, wherein the nonconjugated diene in the terpolymer is 1,4-hexadiene, dicyclopentadiene, 5 - methylene-norbornene, 5-ethylidene-2-norbornene, or 4,7,8,9-tetrahydroindene.

5. A rubber composition according to claim 1, wherein the ethylene-propylene copolymer contains 2 to 20 percent by weight of ethylene and has an intrinsic viscosity of 0.05 to 3.0 dl./g., as measured in Tetralin solution at 135° C., which is produced as a soluble fraction in the polymerization medium used in the manufacture of a crystalline ethylene-propylene copolymer by use of a catalyst of the Ziegler-Natta type.

6. A rubber composition according to claim 1, wherein the ethylene-propylene copolymer is an amorphous copolymer containing 50 to 90 percent by weight of ethylene and having an intrinsic viscosity of 0.05 to 3.0 dl./g., as measured in Tetralin solution at 135° C., which is produced by polymerization of ethylene and propylene by use of a coordinated catalyst of the Ziegler-Natta type.

7. A rubber composition according to claim 1, wherein the rosin ester is an ester of natural rosin with glycerin, triethylene glycol, or pentaerythritol.

References Cited
UNITED STATES PATENTS

| | | | |
|---|---|---|---|
| 3,036,987 | 5/1962 | Ranalli | 260—45.5 |
| 3,354,107 | 11/1967 | Hamed | 260—844 |
| 3,408,253 | 10/1968 | Eckert et al. | 161—253 |
| 3,438,918 | 4/1969 | Arlt et al. | 260—27 |

DONALD E. CZAJA, Primary Examiner

W. E. PARKER, Assistant Examiner

U.S. Cl. X.R.

260—844